United States Patent
Nagata et al.

(10) Patent No.: US 6,583,078 B1
(45) Date of Patent: *Jun. 24, 2003

(54) GLASS-CERAMIC COMPOSITION FOR RECORDING DISK SUBSTRATE

(75) Inventors: Hideki Nagata, Kobe (JP); Toshiharu Mori, Settsu (JP); Hiroshi Yuki, Shiga-Ken (JP); Hideki Kawai, Nishinomiya (JP); Akira Sugimoto, Nishinomiya (JP); Kazuhiko Ishimaru, Kaizuka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/616,033

(22) Filed: Jul. 13, 2000

(30) Foreign Application Priority Data

Jul. 14, 1999 (JP) .......................... 11-200455

(51) Int. Cl.$^7$ ............................................. C03C 10/08
(52) U.S. Cl. ........................ 501/9; 501/10; 428/694 ST
(58) Field of Search ........................ 501/9, 10, 4, 5; 428/694 ST, 694 SG

(56) References Cited

U.S. PATENT DOCUMENTS

| | | | |
|---|---|---|---|
| 4,042,362 A | 8/1977 | MacDowell et al. | |
| 4,304,603 A | 12/1981 | Grossman et al. | ............. 501/9 |
| 4,374,931 A | 2/1983 | Courbin et al. | |
| 4,714,687 A | 12/1987 | Holleran et al. | ............. 501/9 |
| 5,219,799 A | 6/1993 | Beall et al. | ............. 501/5 |
| 5,352,638 A | 10/1994 | Beall et al. | ............. 501/10 |
| 5,391,522 A | 2/1995 | Goto et al. | ............. 501/4 |
| 5,476,821 A | 12/1995 | Beall et al. | ............. 501/10 |
| 5,489,558 A | 2/1996 | Moffatt et al. | ............. 501/69 |
| 5,491,116 A | 2/1996 | Beall et al. | ............. 501/5 |
| 5,532,194 A * | 7/1996 | Kawashima et al. | ............. 501/9 |
| 5,567,217 A | 10/1996 | Goto et al. | ............. 65/33.1 |
| 5,580,363 A | 12/1996 | Goto et al. | ............. 65/29.18 |
| 5,626,935 A | 5/1997 | Goto et al. | ............. 428/64.1 |
| 5,676,721 A | 10/1997 | Fredholm et al. | |
| 5,726,108 A | 3/1998 | Taguchi et al. | |
| 5,786,286 A | 7/1998 | Kohli | ............. 501/8 |
| 5,866,489 A | 2/1999 | Yamaguchi | ............. 501/4 |
| 5,872,069 A | 2/1999 | Abe | ............. 501/5 |
| 5,910,459 A | 6/1999 | Beall et al. | ............. 501/8 |
| 5,968,219 A | 10/1999 | Gille et al. | |
| 6,124,223 A * | 9/2000 | Beall et al. | ............. 501/4 |
| 6,182,472 B1 | 2/2001 | Fredholm et al. | |
| 6,245,411 B1 * | 6/2001 | Goto et al. | ............. 501/9 |
| 6,294,490 B1 * | 9/2001 | Zou et al. | ............. 501/9 |
| 6,344,423 B2 * | 2/2002 | Goto et al. | ............. 501/4 |
| 6,376,084 B1 * | 4/2002 | Kishimoto et al. | ............. 501/5 |
| 6,376,402 B1 * | 4/2002 | Pannhorst et al. | ............. 501/66 |
| 6,387,509 B1 * | 5/2002 | Goto et al. | ............. 501/4 |

FOREIGN PATENT DOCUMENTS

| | | |
|---|---|---|
| JP | 9-208260 | 8/1997 |
| JP | 9-314458 | 12/1997 |
| JP | 10-208226 | 8/1998 |
| JP | 10-226532 | 8/1998 |
| JP | 11-16142 | 1/1999 |
| JP | 11-16143 | 1/1999 |
| JP | 11-322362 | 11/1999 |
| JP | 11-322363 | * 11/1999 |
| JP | 11-343143 | * 12/1999 |

* cited by examiner

*Primary Examiner*—Karl Group
(74) *Attorney, Agent, or Firm*—Burns, Doane, Swecker & Mathis, LLP

(57) ABSTRACT

A glass ceramics composition for recording disk substrate contains, essentially, expressed in terms of weight percent on the oxide basis, from 47.5 to 58 wt % of $SiO_2$, from 10 to 30 wt % of $Al_2O_3$, from 10 to 30 wt % of MgO, and from 0.1 to 2.8 wt % of $ZrO_2$.

24 Claims, No Drawings

GLASS-CERAMIC COMPOSITION FOR RECORDING DISK SUBSTRATE

RELATED APPLICATION

This application is based on application No. 11-200455 filed in Japan, the content of which is hereby incorporated by reference.

1. Field of the Invention

The present invention relates to a glass ceramic composition, more particularly, relates to the glass ceramic composition suitable for magnetic disk substrate.

2. Description of the Prior Art

Magnetic disks are mainly used as recording media of computers. Aluminum alloys have heretofore been used as the material of magnetic disk substrates. However, in the recent trend for a smaller size, a thinner thickness, and a higher recording density of magnetic disks, a higher surface flatness and a higher surface smoothness are increasingly desired. Aluminum alloys cannot satisfy the desire, and a material for magnetic disk substrates which can replace aluminum alloys is required. Thus, in particular, recent attention has been focused on the glass substrate for the disk because of its surface flatness and smoothness and excellent mechanical strength.

As glass substrates for disks for recording media, there have been proposed a chemically reinforced glass substrate having a surface reinforced by ion exchange or like method and a glass ceramics substrate on which a crystal component has been precipitated to reinforce the bonding. In recent years, the latter crystallized glass substrate in which a crystallite has been precipitated in glass by heat treatment has drawn particular attention because of its excellent strength and high productivity.

As recent requirements on the performance of a disk for a recording medium have been more stringent, a substrate material has also been required to have an increased strength related directly to the bending or warping of the disk during high-speed rotation. The strength can be represented by the elastic modulus ratio (=Young's modulus/specific gravity) of the substrate material. The elastic modulus ratio having a higher value indicates a higher mechanical strength. However, a glass-ceramics composition conventionally known has the problem that the productivity thereof is reduced significantly if the strength thereof is to be increased.

SUMMARY OF THE INVENTION

It is an object of the present invention to provide a glass ceramic composition which is suitable for use in an improved glass substrate for a recording medium.

Another object of the present invention is to provide a glass ceramic composition which has high productivity irrespective of its high elastic modulus ratio.

Still another object of the present invention is to provide a disk substrate for a recording medium which has high productivity irrespective of its high elastic modulus ratio.

Thus, the present invention provides a glass-ceramics composition consisting essentially, expressed in terms of weight percent on the oxide basis, of, from 47.5 to 58 wt % of $SiO_2$, from 10 to 30 wt % of $Al_2O_3$, from 10 to 30 wt % of MgO, and from 0.1 to 2.8 wt % of $ZrO_2$.

DESCRIPTION OF THE PREFERRED EMBODIMENT

The present invention provides a glass-ceramics composition consisting essentially, expressed in terms of weight percent on the oxide basis, of, from 47.5 to 58 wt % of $SiO_2$, from 10 to 30 wt % of $Al_2O_3$, from 10 to 30 wt % of MgO, and from 0.1 to 2.8 wt % of $ZrO_2$.

In the composition, $SiO_2$ is a glass network former oxide. The melting properties deteriorate if the proportion thereof is lower than 47.5 wt %. If the proportion thereof exceeds 58 wt %, the composition becomes stable as glass so that the crystal is less likely to be precipitated.

$Al_2O_3$ is a glass intermediate oxide and a component of an aluminum borate crystal, which is a crystalline phase precipitated by heat treatment. If the proportion of $A_2O_3$ is lower than 10 wt %, the crystal is precipitated in reduced quantity and a sufficient strength is not achieved. If the composition rate of $Al_2O_3$ exceeds 30 wt %, the melting temperature is increased and devitrification is more likely to occur.

MgO is a fluxing agent. MgO forms an aggregation of crystal grains. If the proportion of MgO is lower than 10 wt %, the range of operating temperatures is narrowed down and the chemical durability of a glass matrix phase is not improved. If the proportion of MgO exceeds 30 wt %, another crystalline phase is precipitated so that it becomes difficult to achieve a desired strength.

$ZrO_2$ is a glass modifying oxide. By adding $ZrO_2$ serving as a glass modifying oxide, a glass nucleating agent functions effectively. If the proportion of $ZrO_2$ is lower than 0.1 wt %, satisfactory crystal nuclei are less likely to be formed so that crystal grains are increased in size and the crystal is precipitated non-uniformly. This prevents the obtention of an extremely small and uniform crystal structure and the obtention of a flat, smooth surface by polishing, which is required of the glass substrate as a disk substrate. In addition, the chemical durability and the migration resistance are reduced. This may affect a magnetic film and degrades stability in the polishing to cleaning steps. If the proportion of $ZrO_2$ exceeds 2.8 wt %, the melting temperature is increased and devitrification is more likely to occur during melt molding, which lowers productivity. Moreover, the precipitated crystalline phase changes so that desired characteristics are less likely to be obtained.

Besides the above-mentioned basic components, $P_2O_5$ as a fluxing agent and a nuclear forming agent can been added. By adding $P_2O_5$ is a fluxing agent and a nuclear forming agent for precipitating a silicate crystal, the crystal are uniformly precipitated over the entire glass. If the proportion of $P_2O_5$ is lower than 0.1 wt %, satisfactory nuclei are less likely to be formed so that crystal grains are increased in size or the crystal is precipitated non-uniformly. Consequently, an extremely small and uniform crystal structure is less likely to be obtained and a flat, smooth surface required of the glass substrate as a disk substrate cannot be obtained by polishing. If the proportion of $P_2O_5$ exceeds 5 wt %, the reactivity of the glass in a molten state to a filter medium is increased and the devitrifiability thereof is also increased, so that productivity during melt molding is reduced. In addition, the chemical durability is reduced, which may affect a magnetic film, while the stability in the polishing to cleaning steps is lowered.

Besides the above-mentioned basic components, $Nb_2O_5$ as a fluxing agent can been added. By adding $Nb_2O_5$ serving as a fluxing agent, production stability has been improved. If the proportion of $Nb_2O_5$ is lower than 0.1 wt %, the rigidity is not sufficiently improved. If the proportion of $Nb_2O_5$ exceeds 9 wt %, the crystallization of the glass becomes unstable and the precipitated crystalline phase cannot be controlled, so that desired characteristics are less likely to be obtained.

Besides the above-mentioned basic components, $Ta_2O_5$ as a fluxing agent can been added. By adding $Ta_2O_5$ serving as a fluxing agent, the melting properties and strength are improved, while the chemical durability of the glass matrix phase is improved. If the proportion of $Ta_2O_5$ is lower than 0.1 wt %, however, the rigidity is not sufficiently improved. If the proportion of $Ta_2O_5$ exceeds 9 wt %, the crystallization of the glass becomes unstable and the precipitated crystalline phase cannot be controlled, so that desired characteristics are less likely to be obtained.

Besides the above-mentioned basic components, $Li_2O$ as a fluxing agent can been added. By adding $Li_2O$ serving as a fluxing agent, production stability has been improved. If the proportion of $Li_2O$ is lower than 0.1 wt %, the melting properties deteriorate. If the proportion of $Li_2O$ exceeds 12 wt %, stability in the polishing to cleaning steps is degraded.

Besides the above-mentioned basic components, $TiO_2$ as a fluxing agent can been added. By adding $TiO_2$ serving as a fluxing agent has been added, production stability has been improved. If the proportion of $TiO_2$ is lower than 0.1 wt %, the melting properties deteriorate and the crystal is less likely to grow. If the proportion of $TiO_2$ exceeds 12 wt %, the crystallization is promoted rapidly so that the control of the crystallized state becomes difficult, the precipitated crystal is increased in size, and the crystalline phase becomes non-uniform. This prevents the obtention of an extremely small and uniform crystal structure and the obtention of a flat, smooth surface by polishing, which is required of the glass substrate as a disk substrate. Moreover, devitrification is more likely to occur during melt molding, which lowers productivity.

Besides the above-mentioned basic components, $B_2O_3$ as a former can been added. By adding $B_2O_3$ serving as a former, the phase splitting of the glass is promoted and the precipitation and growth of the crystal are promoted. If the proportion of $B_2O_3$ is lower than 0.1 wt %, the melting properties are not improved sufficiently. If the proportion of $B_2O_3$ exceeds 5 wt %, devitrification is more likely to occur and molding becomes difficult, while the crystal is increased in size, so that an extremely small crystal is no more obtained.

Besides the above-mentioned basic components, $Y_2O_3$ as a fluxing agent can been added. By adding $Y_2O_3$ serving as a fluxing agent, the rigidity has been improved. If the proportion of $Y_2O_3$ is lower than 0.1 wt %, however, the rigidity is not improved sufficiently. If the proportion of $Y_2O_3$ exceeds 9 wt %, the precipitation of the crystal is suppressed and a sufficient degree of crystallization is not achieved, so that desired characteristics are not achieved.

Besides the above-mentioned basic components, $K_2O$ as a fluxing agent can been added. By adding $K_2O$ serving as a fluxing agent, production stability has been improved. If the proportion of $K_2O$ is lower than 0.1 wt %, however, the melting properties are not improved sufficiently. If the proportion of $K_2O$ exceeds 5 wt %, the glass becomes stable and the crystallization is suppressed, while the chemical durability is reduced. This may affect a magnetic film and degrades stability in the polishing to cleaning steps.

Besides the above-mentioned basic components, $Sb_2O_3$ as a clarifier can been added. By adding $Sb_2O_3$ serving as a clarifier, production stability has been improved. If the proportion of $Sb_2O_3$ is lower than 0.1 wt %, however, a sufficient clarifying effect can not be achieved and productivity is lowered. If the proportion of $Sb_2O_3$ exceeds 5 wt %, the crystallization of the glass becomes unstable and the precipitated crystalline phase cannot be controlled so that required characteristics are less likely to be obtained.

Besides the above-mentioned basic components, ZnO as a fluxing agent can been added. By adding ZnO serving as a fluxing agent, it helps uniform precipitation of the crystal. If the proportion of ZnO is lower than 0.1 wt %, however, the uniformity of the crystal is not sufficiently improved. If the proportion of ZnO exceeds 5 wt %, the glass becomes stable and the crystallization is suppressed, so that required strength is less likely to be achieved.

Besides the above-mentioned basic components, $La_2O_3$ as a fluxing agent can been added. By adding $La_2O_3$ serving as a fluxing agent, the precipitation of the crystal is suppressed. If the proportion of $La_2O_3$ is lower than 0.1 wt %, however, the rigidity is not improved sufficiently. If the proportion of $La_2O_3$ exceeds 5 wt %, the crystallization of the glass becomes unstable and the precipitated crystalline phase cannot be controlled, so that required properties are less likely to be obtained.

Next, a description will be given to a fabrication method. Raw materials containing the main components of the glass substrate to be finally produced are sufficiently mixed in specified proportions. The resulting mixture is placed in a platinum crucible and caused to melt. The molten product is cast in a metal mold so that it is formed into a rough configuration and annealed to a room temperature. The molten product is then held at a specified temperature for a specified time during a primary treatment (heat treatment) such that crystal nuclei are formed. Subsequently, the molded mixture is held at a specified temperature for a specified time during a secondary heat treatment such that crystal nuclei grow. By slowly cooling the molded mixture, an objective crystallized glass is obtained.

NUMERICAL EXAMPLES

A description will be given next to specific numerical examples incorporating the embodiments. In TABLE 1 are shown: the proportions(unit: wt %) of materials composing the glasses of the first to fifth examples, the melting temperatures and times; the primary heat treatment temperatures and times; the secondary heat treatment temperatures and times; the main precipitated crystalline phases; the subordinate precipitated crystalline phases; the mean diameters of the crystal grains; the specific gravity s: the Young's moduli; and the specific moduli. Likewise, tshe glasses of the sixth to tenth examples are shown in TABLE 2. Likewise, the glasses of the eleventh to fifteenth examples are shown in TABLE 3. Likewise, the glasses of the sixteenth to twentieth examples are shown in TABLE 4.

TABLE 1

|  | Example 1 | Example 2 | Example 3 | Example 4 | Example 5 |
| --- | --- | --- | --- | --- | --- |
| $SiO_2$ | 55.6 | 52.9 | 58.0 | 50.0 | 52.0 |
| $Al_2O_3$ | 15.6 | 16.7 | 18.0 | 24.2 | 26.5 |
| MgO | 15.0 | 17.1 | 23.6 | 22.4 | 18.7 |
| $P_2O_5$ | 1.6 | 1.5 | 0.2 | 1.2 |  |
| $Nb_2O_5$ |  |  |  |  | 2.0 |
| $Ta_2O_5$ |  |  |  |  |  |
| $Li_2O$ | 2.7 | 2.5 |  |  |  |
| $TiO_2$ | 5.0 | 7.1 |  |  |  |
| $ZrO_2$ | 2.5 | 2.0 | 0.2 | 2.2 | 0.8 |
| $B_2O_3$ |  |  |  |  |  |
| $Y_2O_3$ |  |  |  |  |  |
| $K_2O$ | 1.7 |  |  |  |  |
| $Sb_2O_3$ | 0.4 |  |  |  |  |
| ZnO |  |  |  |  |  |
| $La_2O_3$ |  |  |  |  |  |
| Melting Temperature (° C.) | 1350 | 1350 | 1400 | 1400 | 1400 |
| Melting Time (hours) | 3.00 | 3.00 | 3.50 | 3.50 | 3.50 |
| Primary | 660 | 660 | 690 | 690 | 690 |

TABLE 1-continued

|  | Example 1 | Example 2 | Example 3 | Example 4 | Example 5 |
|---|---|---|---|---|---|
| Treatment Temperature (° C.) |  |  |  |  |  |
| Primary Treatment Time (hours) | 4.50 | 4.50 | 5.00 | 5.00 | 5.00 |
| Secondary Treatment Temperature (° C.) | 740 | 740 | 760 | 760 | 760 |
| Secondary Treatment Time (hours) | 4.00 | 4.00 | 4.50 | 4.50 | 4.50 |
| Main Crystalline Phase | Magnesium alumina silicate | Magnesium alumina silicate | Magnesium alumina silicate | Magnesium alumina silicate | Magnesium alumina silicate |
| Sub Crystalline Phase | Rutil | Rutil |  |  |  |
| Diameter of Crystal | 0.05 | 0.05 | 0.05 | 0.05 | 0.05 |
| Specific Gravity (g/cm$^3$) | 2.63 | 2.72 | 2.67 | 2.61 | 2.73 |
| Yong's Modulus | 96.16 | 98.35 | 99.16 | 94.16 | 99.16 |
| Elastic Modulus Ratio | 36.53 | 36.16 | 37.11 | 36.05 | 36.30 |

TABLE 2

|  | Example 6 | Example 7 | Example 8 | Example 9 | Example 10 |
|---|---|---|---|---|---|
| SiO$_2$ | 48.0 | 54.0 | 52.2 | 52.2 | 47.5 |
| Al$_2$O$_3$ | 24.2 | 19.2 | 22.0 | 28.0 | 20.7 |
| MgO | 22.4 | 24.5 | 18.1 | 17.0 | 23.8 |
| P$_2$O$_5$ |  |  |  |  |  |
| Nb$_2$O$_5$ | 4.0 |  |  |  |  |
| Ta$_2$O$_5$ |  | 2.2 | 5.2 |  |  |
| Li$_2$O |  |  |  | 2.4 | 6.0 |
| TiO$_2$ |  |  |  |  |  |
| ZrO$_2$ | 1.4 | 0.1 | 2.5 | 0.4 | 2.0 |
| B$_2$O$_3$ |  |  |  |  |  |
| Y$_2$O$_3$ |  |  |  |  |  |
| K$_2$O |  |  |  |  |  |
| Sb$_2$O$_3$ |  |  |  |  |  |
| ZnO |  |  |  |  |  |
| La$_2$O$_3$ |  |  |  |  |  |
| Melting Temperature (° C.) | 1400 | 1400 | 1400 | 1400 | 1400 |
| Melting Time (hours) | 3.50 | 3.50 | 3.50 | 3.50 | 3.50 |
| Primary Treatment Temperature (° C.) | 690 | 690 | 690 | 690 | 690 |
| Primary Treatment Time (hours) | 5.00 | 5.00 | 5.00 | 5.00 | 5.00 |
| Secondany Treatment Temperature (° C.) | 760 | 760 | 760 | 760 | 760 |
| Secondary Treatment Time (hours) | 4.50 | 4.50 | 4.50 | 4.50 | 4.50 |
| Main Crystalline Phase | Magnesium alumina silicate | Magnesium alumina silicate | Magnesium alumina silicate | Magnesium alumina silicate | Magnesium alumina silicate |

TABLE 2-continued

|  | Example 6 | Example 7 | Example 8 | Example 9 | Example 10 |
|---|---|---|---|---|---|
| Sub Crystalline Phase |  |  |  |  |  |
| Diameter of Crystal | 0.05 | 0.05 | 0.05 | 0.05 | 0.05 |
| Specific Gravity (g/cm$^3$) | 2.75 | 2.78 | 2.75 | 2.67 | 2.71 |
| Yong's Modulus | 101.16 | 101.16 | 104.16 | 108.16 | 106.16 |
| Elastic Modulus Ratio | 36.76 | 36.36 | 37.85 | 40.48 | 39.14 |

TABLE 3

|  | Example 11 | Example 12 | Example 13 | Example 14 | Example 15 |
|---|---|---|---|---|---|
| SiO$_2$ | 49.5 | 48.0 | 53.2 | 50.5 | 53.2 |
| Al$_2$O$_3$ | 24.2 | 22.1 | 21.0 | 24.5 | 21.9 |
| MgO | 21.5 | 19.1 | 25.3 | 22.2 | 22.2 |
| P$_2$O$_5$ |  |  |  |  |  |
| Nb$_2$O$_5$ |  |  |  |  |  |
| Ta$_2$O$_5$ |  |  |  |  |  |
| Li$_2$O |  |  |  |  |  |
| TiO$_2$ | 4.0 | 9.0 |  |  |  |
| ZrO$_2$ | 0.8 | 1.8 | 0.5 | 2.8 | 2.2 |
| B$_2$O$_3$ |  |  |  |  | 0.5 |
| Y$_2$O$_3$ |  |  |  |  |  |
| K$_2$O |  |  |  |  |  |
| Sb$_2$O$_3$ |  |  |  |  |  |
| ZnO |  |  |  |  |  |
| La$_2$O$_3$ |  |  |  |  |  |
| Melting Temperature (° C.) | 1400 | 1400 | 1400 | 1400 | 1350 |
| Melting Time (hours) | 3.50 | 3.50 | 3.50 | 3.50 | 3.00 |
| Primary Treatment Temperature (° C.) | 690 | 690 | 690 | 690 | 660 |
| Primary Treatment Time (hours) | 5.00 | 5.00 | 5.00 | 5.00 | 4.50 |
| Secondary Treatment Temperature (° C.) | 760 | 760 | 760 | 760 | 740 |
| Secondary Treatment Time (hours) | 4.50 | 4.50 | 4.50 | 4.50 | 4.00 |
| Main Crystalline Phase | Magnesium alumina silicate | Magnesium alumina silicate | Magnesium alumina silicate | Magnesium alumina silicate | Magnesium alumina silicate |
| Sub Crystalline Phase | Rutil | Rutil |  |  |  |
| Diameter of Crystal | 0.05 | 0.05 | 0.05 | 0.05 | 0.05 |
| Specific Gravity (g/cm$^3$) | 2.95 | 2.98 | 2.88 | 2.91 | 2.63 |
| Yong's Modulus | 109.36 | 108.36 | 104.16 | 104.36 | 96.16 |
| Elastic Modulus Ratio | 37.05 | 36.34 | 36.14 | 35.84 | 36.53 |

TABLE 4

|  | Example 16 | Example 17 | Example 18 | Example 19 | Example 20 |
|---|---|---|---|---|---|
| $SiO_2$ | 58.0 | 52.0 | 50.0 | 48.2 | 48.2 |
| $Al_2O_3$ | 18.4 | 27.5 | 15.3 | 26.0 | 21.6 |
| MgO | 17.6 | 16.7 | 27.7 | 20.9 | 18.2 |
| $P_2O_5$ | | | | | |
| $Nb_2O_5$ | | | | | |
| $Ta_2O_5$ | | | | | |
| $Li_2O$ | | | | | |
| $TiO_2$ | | | | | |
| $ZrO_2$ | 2.8 | 2.0 | 2.8 | 1.2 | 1.5 |
| $B_2O_3$ | 3.2 | | | | |
| $Y_2O_3$ | | 1.8 | 4.2 | | |
| $K_2O$ | | | | 1.0 | 4.0 |
| $Sb_2O_3$ | | | | 0.2 | 2.0 |
| ZnO | | | | 0.5 | 2.0 |
| $La_2O_3$ | | | | 2.0 | 2.5 |
| Melting Temperature (° C.) | 1350 | 1400 | 1400 | 1350 | 1350 |
| Melting Time (hours) | 3.00 | 3.50 | 3.50 | 3.50 | 3.50 |
| Primary Treatment Temperature (° C.) | 660 | 690 | 690 | 660 | 660 |
| Primary Treatment Time (hours) | 4.50 | 5.00 | 5.00 | 5.00 | 5.00 |
| Secondary Treatment Temperature (° C.) | 740 | 760 | 760 | 740 | 740 |
| Secondary Treatment Time (hours) | 4.00 | 4.50 | 4.50 | 4.50 | 4.50 |
| Main Crystalline Phase | Magnesium alumina silicate | Magnesium alumina silicate | Magnesium alumina silicate | Magnesium alumina silicate | Magnesium alumina silicate |
| Sub Crystalline Phase | | | | | |
| Diameter of Crystal | 0.05 | 0.05 | 0.05 | 0.05 | 0.05 |
| Specific Gravity (g/cm³) | 2.63 | 2.91 | 2.95 | 2.95 | 2.98 |
| Yong's Module | 96.16 | 110.16 | 112.16 | 103.16 | 106.16 |
| Elastic Module Ratio | 36.53 | 37.83 | 37.99 | 34.95 | 35.60 |

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A glass ceramics composition for recording disk substrate consisting essentially, expressed in terms of weight percent on an oxide basis, of
   from 47.5 to 58 wt % of $SiO_2$,
   from 10 to 30 wt % of $Al_2O_3$,
   from 10 to 30 wt % of MgO, and
   from 0.1 to 2.8 wt % of $ZrO_2$,
wherein the glass ceramic has a main crystalline phase containing magnesium alumina silicate as a predominant constituent.

2. A glass ceramics composition as claimed in claim 1, wherein said glass ceramic composition further consists essentially, expressed in terms of weight percent on an oxide basis, of
   from 0.1 to 5 wt % of $P_2O_5$.

3. A glass ceramics composition as claimed in claim 1, wherein said glass ceramic composition further consists essentially, expressed in terms of weight percent on an oxide basis, of
   from 0.1 to 9 wt % of $Nb_2O_5$.

4. A glass ceramics composition as claimed in claim 1, wherein said glass ceramic composition further consists essentially, expressed in terms of weight percent on an oxide basis, of
   from 0.1 to 9 wt % of $Ta_2O_5$.

5. A glass ceramics composition as claimed in claim 1, wherein said glass ceramic composition further consists essentially, expressed in terms of weight percent on an oxide basis, of
   from 0.1 to 12 wt % of $Li_2O$.

6. A glass ceramics composition as claimed in claim 1, wherein said glass ceramic composition further consists essentially, expressed in terms of weight percent on an oxide basis, of
   from 0.1 to 12 wt % of $TiO_2$.

7. A glass ceramics composition as claimed in claim 1, wherein said glass ceramic composition further consists essentially, expressed in terms of weight percent on an oxide basis, of
   from 0.1 to 5 wt % of $B_2O_3$.

8. A glass ceramics composition as claimed in claim 1, wherein said glass ceramic composition further consists essentially, expressed in terms of weight percent on an oxide basis, of
   from 0.1 to 9 wt % of $Y_2O_3$.

9. A glass ceramics composition as claimed in claim 1, wherein said glass ceramic composition further consists essentially, expressed in terms of weight percent on an oxide basis, of
   from 0.1 to 5 wt % of $K_2O$.

10. A glass ceramics composition as claimed in claim 1, wherein said glass ceramic composition further consists essentially, expressed in terms of weight percent on an oxide basis, of
    from 0.1 to 5 wt % of $Sb_2O_3$.

11. A glass ceramics composition as claimed in claim 1, wherein said glass ceramic composition further consists essentially, expressed in terms of weight percent on an oxide basis, of
    from 0.1 to 5 wt % of ZnO.

12. A glass ceramics composition as claimed in claim 1, wherein said glass ceramic composition further consists essentially, expressed in terms of weight percent on an oxide basis, of
    from 0.1 to 5 wt % of $La_2O_3$.

13. A glass ceramic recording disk substrate, wherein the glass ceramic is prepared from a composition which consists essentially, expressed in terms of weight percent on an oxide basis, of
    from 47.5 to 58 wt % of $SiO_2$,
    from 10 to 30 wt % of $Al_2O_3$,
    from 10 to 30 wt % of MgO, and
    from 0.1 to 2.8 wt % of $ZrO_2$,
wherein the glass ceramic has a main crystalline phase containing magnesium alumina silicate as a predominant constituent.

14. A recording disk substrate as claimed in claim 13, wherein said glass ceramic composition further consists essentially, expressed in terms of weight percent on an oxide basis, of from 0.1 to 5 wt % of $P_2O_5$.

15. A recording disk substrate as claimed in claim 13, wherein said glass ceramic composition further consists essentially, expressed in terms of weight percent on an oxide basis, of from 0.1 to 9 wt % of $Nb_2O_5$.

16. A recording disk substrate as claimed in claim 13, wherein said glass ceramic composition further consists essentially, expressed in terms of weight percent on an oxide basis, of from 0.1 to 9 wt % of $Ta_2O_5$.

17. A recording disk substrate as claimed in claim 13, wherein said glass ceramic composition further consists essentially, expressed in terms of weight percent on an oxide basis, of from 0.1 to 12 wt % of $Li_2O$.

18. A recording disk substrate as claimed in claim 13, wherein said glass ceramic composition further consists essentially, expressed in terms of weight percent on an oxide basis, of from 0.1 to 12 wt % of $TiO_2$.

19. A recording disk substrate as claimed in claim 13, wherein said glass ceramic composition further consists essentially, expressed in terms of weight percent on an oxide basis, of from 0.1 to 5 wt % of $B_2O_3$.

20. A recording disk substrate as claimed in claim 13, wherein said glass ceramic composition further consists essentially, expressed in terms of weight percent on an oxide basis, of from 0.1 to 9 wt % of $Y_2O_3$.

21. A recording disk substrate as claimed in claim 13, wherein said glass ceramic composition further consists essentially, expressed in terms of weight percent on an oxide basis, of from 0.1 to 5 wt % of $K_2O$.

22. A recording disk substrate as claimed in claim 13, wherein said glass ceramic composition further consists essentially, expressed in terms of weight percent on an oxide basis, of from 0.1 to 5 wt % of $Sb_2O_3$.

23. A recording disk substrate as claimed in claim 13, wherein said glass ceramic composition further consists essentially, expressed in terms of weight percent on an oxide basis, of from 0.1 to 5 wt % of $ZnO$.

24. A recording disk substrate as claimed in claim 13, wherein said glass ceramic composition further consists essentially, expressed in terms of weight percent on an oxide basis, of from 0.1 to 5 wt % of $La_2O_3$.

* * * * *